United States Patent Office 3,055,850
Patented Sept. 25, 1962

3,055,850
HALOGEN CONTAINING POLYURETHANE
FOAMS AND PREPARATION OF SAME
Michael Worsley, Niagara Falls, and Raymond R. Hindersinn, Lewiston, N.Y., assignors to Hooker Chemical Corporation, Niagara Falls, N.Y., a corporation of New York
No Drawing. Filed Nov. 18, 1959, Ser. No. 853,689
11 Claims. (Cl. 260—2.5)

This invention relates to novel foamable polyurethane compositions and to the polyurethane foams prepared therefrom. More particularly the present invention resides in halogen containing foamable polyurethane compositions containing the dicarboxylic acid adduct of hexahalocyclopentadiene and a dicarboxylic compound containing aliphatic carbon to carbon unsaturation co-reacted therein, said foamable composition and resultant polyurethane foam having a high halogen content and prepared from substantially liquid reaction products.

The methods of the prior art have attained fire-resistance in urethane foams by the use of various plasticizing substances, such as the various phosphate or phosphonate esters or chlorinated compounds. However, such plasticizing substances are additives which are not chemically combined with the polyurethane plastic and are progressively lost from the plastic by evaporation, leaching, etc. Consequently, the product does not have a permanently reduced flammability. Furthermore, the plasticizing additive affects the physical properties of the product. Alternatively, the art has incorporated chlorine containing compounds into the resultant product, for example, S.N. 623,795, "Fire Resistant Foams," filed November 23, 1956. This method, although it overcomes the disadvantages inherent in the use of plasticizing substances, suffers from the serious disadvantage that the incorporation of the chlorine containing compound into the polyester causes a rapid increase in viscosity, and solid compositions usually result at a chlorine content greater than fifteen percent, therefore requiring special handling in order to obtain a polyurethane foam of high chlorine content.

Most flexible polyurethane foams are claimed to be fire resistant per se and, therefore, very little has been done to increase the fire resistance of these materials. The claimed fire resistance, however, usually is based on the fact that such materials are self-extinguishing when the foams are ignited by virtue of the fact that the burning elastomeric material melts and falls away from the article thus extinguishing the flame. The melt, however, is flammable and will burn if ignited.

It is therefore an object of the present invention to provide a foamable polyurethane composition which is useful in the preparation of flame retardant, rigid and flexible polyurethane foams. It is a further object of the present invention to provide a foamable composition having a high halogen content, which foamable composition contains co-reacted therein an adduct of hexahalocyclopentadiene and maleic anhydride. It is a still further object of the present invention to provide a foamable composition which satisfies the aforementioned objects and which foamable composition is comprised of reactants which are substantially liquid at room temperature, thereby providing a system which may be handled by conventional metering and pumping equipment. It is a further object of the present invention to provide a foamable composition from which flame retardant polyurethane foams may be easily and inexpensively prepared, while having excellent physical characteristics. An additional object of the present invention is to prepare truly fire resistant polyurethane foams which are non-flammable in the solid or molten state. Further objects and advantages of the present invention will appear hereinafter.

In accordance with the present invention it has been found that foamable polyurethane compositions satisfying the afore-mentioned objects may be prepared by reacting together (I) the liquid resinous reaction product of (A) the dicarboxylic acid adduct of hexahalocyclopentadiene and a dicarboxylic compound containing aliphatic carbon to carbon unsaturation wherein the halogen is selected from the group consisting of chlorine, bromine, fluorine, and mixtures thereof, and (B) an organic polyisocyanate; and (II) a hydroxyl containing polymeric material having a hydroxyl number of between thirty and six hundred and fifty selected from the group consisting of (A) a polyester comprising the reaction product of a polyhydric alcohol and a polycarboxylic compound, (B) a polyether comprising the reaction product of a monomeric 1,2-epoxide and a material selected from the group consisting of a polyhydric alcohol and a polycarboxylic acid, and (C) mixtures thereof; and (III) a foaming agent.

The diisocyanate or polyisocyanate that may be employed is preferably liquid in order to readily react with the solid hexahalocyclopentadiene adduct. Aromatic isocyanates are preferred because they are more reactive and less toxic than the aliphatic members. Typical isocyanates include the following: 2,4-tolylene diisocyanate; 2,6-tolylene diisocyanate; hexamethylene diisocyanate; ethylene diisocyanate; trimethylene diisocyanate; tetramethylene diisocyanate; pentamethylene diisocyanate; 1,2-propylene diisocyanate; 1,2-butylene diisocyanate; 1,3-butylene diisocyanate; the liquid reaction products of (1) diisocyanates and (2) polyols or polyamines, etc. In addition, mixtures of isocyanates may be employed. The preferred isocyanates are the diisocyanates, especially mixtures thereof, because they are readily available commercially.

The preferred dicarboxylic acid adduct of hexahalocyclopentadiene is 1,4,5,6,7,7-hexachlorobicyclo-(2.2.1)-5-heptene-2,3-dicarboxylic acid because it is readily available commercially. Others that may be employed include 1,4,5,6,7,7 - hexabromobicyclo - (2.2.1)-5-heptene-2,3-dicarboxylic acid; 1,4,5,6,7,7 - hexachloro-2-methylbicyclo-(2.2.1)-5-heptene-2,3-bicarboxylic acid; 1,4,5,6-tetrachloro-7,7-difluorobicyclo-(2.2.1)-5-heptene - 2,3-dicarboxylic acid; 1,4,5,6,7,7 - hexachlorobicyclo-(2.2.1)-5-heptene-2-acetic-2-carboxylic acid. The halogen in hexahalocyclopentadiene is selected from the group consisting of chlorine, bromine, fluorine and mixtures thereof. Typical dicarboxylic compounds containing aliphatic carbon to carbon unsaturation which may be used in preparing the dicarboxylic acid adduct includes maleic, fumaric, itaconic, citraconic, etc. The acid halides, acid esters or acid anhydrides may be used in preparing the dicarboxylic acid adduct, with the acid anhydrides being preferred.

In the preparation of the liquid resinous reaction product of the adduct of hexahalocyclopentadiene with an organic polyisocyanate, the particle size of the hexahalocyclopentadiene adduct should preferably be ten mesh or smaller, that is have a particle size of 1.68 millimeters or smaller. The hexahalocyclopentadiene adduct is added to the isocyanate, preferably portionwise, at a temperature of from about thirty to one hundred and twenty degrees centigrade. Higher or lower temperatures may be used as desired. The ratios employed of hexahalocyclopentadiene adduct to polyisocyanate are such as to provide one carboxyl group to at least four isocyanato groups. After the polyisocyanate and the hexahalocyclopentadiene adduct are mixed together, the reaction product is heated at a temperature preferably from about one hundred and ten to one hundred and sixty degrees centigrade for preferably from about thirty minutes to one hour and thirty minutes.

The liquid resinous reaction product of the hexahalocyclopentadiene adduct and the organic polyisocyanate are reacted with a hydroxyl containing polyester or polyether in the presence of a foaming agent, and optionally a reaction catalyst. The catalyst employed may be any of the known conventional catalysts for isocyanate reactions, such as tertiary amines, for example, triethylamine, N-methyl morpholine, triethanolamine, etc., or antimony compounds such as disclosed and claimed in S.N. 803,820, filed April 3, 1959, for example, antimony caprylate, antimony naphthenate or antimonous chloride. In addition, tin compounds may be employed such as disclosed and claimed in S.N. 803,819, filed April 3, 1959, for example dibutyltin dilaurate, tri-n-octyltin oxide, hexabutylditin, tributyltin phosphate or stannic chloride. Rigid or flexible polyurethane foams are thereby obtained. The rigid polyurethane foams utilize a highly branched hydroxyl rich polyester or polyether having a hydroxyl number of between about two hundred and six hundred and fifty. The flexible polyurethane foams utilize a linear relatively hydroxyl poor polyester or polyether having a hydroxyl number of between about thirty and one hundred. If a polyester or polyether with a hydroxyl number between about one hundred and two hundred is employed, a semi-rigid polyurethane foam is obtained.

The concentration of the resinous reaction product of the hexahalocyclopentadiene adduct and the organic polyisocyanate may be varied from ninety to one hundred and ten percent of isocyanato groups with respect to the sum of the hydroxyl containing polymeric material and foaming agent based on the number of hydroxyl and carboxyl groups in each.

Any foaming agent may be employed which will react with the free NCO group of the isocyanate to liberate gaseous products; in addition low boiling solvents may also be used. The preferred foaming agents are the fluorochlorocarbons boiling in the range of twenty to fifty degrees centigrade, and mixtures thereof, for example, trichlorofluoromethane, trichlorotrifluoroethane, dichloromonofluoromethane, monochloroethane, monochloromonofluoroethane, difluoromonochloroethane, difluorodichloroethane. Other foaming agents which may be employed include water, a tertiary alcohol and a concentrated acid such as is disclosed and claimed in U.S. 2,865,869, polymethylol phenols, dimethylol ureas, polycarboxylic compounds, and formic acid. Mixtures of any of the above foaming agents may also be used. The amount of foaming agent used is not critical, but will be dictated by the type of foam desired. If a very dense foam is desired, only a small amount need be used. If a very light foam is desired a maximum amount should be used. The amount used will also depend upon the particular foaming agent.

The polyesters employed are known in the art and are the reaction products of a polyhydric alcohol and a polycarboxylic compound. The term polycarboxylic compound is intended to include the acids, the acid anhydrides, the acid halides or the acid esters, or mixtures thereof.

It is generally desirable, especially in rigid or semi-rigid foams, that at least a portion of the total polyhydric alcohol component consist of three hydroxyl groups in order to provide a means for branching; however the ratio of dihydric alcohol to trihydric alcohol may be varied depending on the amount of branching desired. The polyhydric alcohols may be aliphatic, cycloaliphatic, heterocyclic or aromatic and may be saturated or unsaturated. The alcohol may contain one or more dissimilar atoms between carbon atoms in their molecule, such as oxygen, sulfur, and the like. They may also be substituted with non-interfering substituents, such as halogen atoms, ester radicals, and the like. Illustrative polyhydric alcohols include the following: glycerol; poly- glycerol; pentaerythritol; polypentaerythritol; mannitol; sorbitol; methyltrimethylolmethane; 1,4,6-octanetriol; butanediol; pentanediol; hexanediol; dodecanediol; octanediol; chloropentanediol; glycerol allyl ether; glycerol monoethyl ether; triethylene glycol; 2-ethylhexanediol-1,4; 3,3'-thiodipropanol; 4,4'-sulfonyldihexanol; 3,5-dithiahexanediol-1,6; 3,6-dithiaoctanediol-1,8; cyclohexanediol-1,4; 1,2,6-hexanetriol; 1,3,5-hexanetriol; polyallyl alcohol; 1,3-bis(2 - hydroxyethoxy) propane; 5,5' - dihydroxydiamyl ether; tetrahydrofuran-2,5-dipropanol; tetrahydrofuran-2,5-dipentanol; 2,5-dihydroxytetrahydrofuran; tetrahydrothiophene-2,5-dipropanol; tetrahydropyrrole-2,5-propanol; 4-hydroxy-3 - hydroxytetrahydropyran; 2,5-dihydroxy-3,4-dihydro-1,2-pyran; 4,4'-sulfinyldipropanol; 2,2-bis(4-hydroxyphenyl) - propane; 2,2'-bis(4-hydroxyphenyl)-methane; and the like. Preferred polyols are the open-chain aliphatic polyhydric alcohols and polyalkylene ether polyols possessing from two to six esterifiable hydroxyl groups and containing no more than twenty carbon atoms.

The polycarboxylic compounds may be aliphatic, cycloaliphatic, aromatic or heterocyclic and may be saturated or unsaturated. Illustrative polycarboxylic compounds include the following: phthalic acid; maleic acid; dodecylmaleic acid; octadecenylmaleic acid; fumaric acid; aconitic acid; itaconic acid; 3,3'-thiodipropionic acid; 4,4'-sulfonyldihexanoic acid; 3-octenedioic-1,7 acid; 3-methyl-3-decenedioic acid; succinic acid; adipic acid; 1,4-cyclohexadiene-1,2-dicarboxylic acid; 3-methyl-3,5-cyclohexadiene-1,2-dicarboxylic acid; 3-chloro-3,5-cyclohexadiene-1,2-dicarboxylic acid; 8,12-eicosadienedioic acid; 8-vinyl-10-octadecenedioic acid; and the like. Preferred polycarboxylic compounds are the aliphatic and cycloaliphatic dicarboxylic acids containing no more than fourteen carbon atoms and the aromatic dicarboxylic acids containing no more than fourteen carbon atoms.

Part or all of either the polyhydric alcohol or the polycarboxylic portion may consist of an adduct of hexahalocyclopentadiene, wherein the halogen is selected from the group consisting of chlorine, bromine, fluorine and mixtures thereof. Among the adducts of hexahalocyclopentadiene and polycarboxylic compounds which may be used are: 1,4,5,6,7,7 - hexachlorobicyclo-(2.2.1)-5-heptene-2,3-dicarboxylic acid; 1,4,5,6,7,7-hexachlorobicyclo-(2.2.1)-5-heptene-2,3-dicarboxylic anhydride; 1,4,5,6,7,7-hexachloro-2-methylbicyclo-(2.2.1)-5-heptene-2,3-dicarboxylic anhydride; the mono- or di-methyl ester of 1,4,5,6,7,7-hexachlorobicyclo - (2.2.1) - 5 - heptene-2,3-dicarboxylic acid; 1,4,5,6-tetrachloro-7,7-difluorobicyclo - (2.2.1)-5-heptene-2,3 - dicarboxylic acid; 1,4,5,6,7,7 - hexachlorobicyclo-(2.2.1) - 5 - heptene-2-acetic-2-carboxylic anhydride; and 1,4,5,6,7,7-hexachlorobicyclo - (2.2.1) - 5-heptene-2,3-dicarbonyl chloride which is the adduct of hexachlorocyclopentadiene with fumaryl chloride.

Among the adducts of hexahalocyclopentadiene and polyhydric alcohols which may be used are: 1,4,5,6,7,7-hexachloro-2,3-bis-hydroxymethylbicyclo - (2.2.1)-5-heptene; and 3-(1,4,5,6,7,7-hexachlorobicyclo-(2.2.1)-5-heptene-2-yl)-methoxy-1,2-propanediol; 1,4,5,6 - tetrachloro-7,7-difluoro-2,3-bis-hydroxymethylbicyclo - (2.2.1)-5-heptene; 1,4,5,6,7,7 - hexabromo - 2,3-bis-hydroxymethylbicyclo-(2.2.1)-5-heptene; 3-(1,4,5,6-tetrachloro-7,7-difluorobicyclo-(2.2.1)-5-heptene-2-yl)-methoxy-1,2-propane diol. These compounds and the method of preparation are disclosed in copending application S.N. 308,922 for "Poly-Halogen-Containing Polyhydric Compounds," filed September 10, 1952, now U.S. Patent 3,007,958.

The polyethers are the reaction products of either a polyhydric alcohol or a polycarboxylic acid and a monomeric, 1,2-epoxide possessing a single 1,2-epoxy group, such as, for example, propylene oxide. The polyhydric alcohols which may be employed are any of the polyhydric alcohols hereinbefore listed. The polycarboxylic acids which may be employed are any of the polycarboxylic acids hereinbefore listed. Examples of monomeric 1,2-epoxides include ethylene oxide, propylene oxide, butylene oxide, isobutylene oxide, 2,3-epoxyhexane, 3-ethyl - 2,3 - epoxyoctane, epichlorohydrin, epibromohydrin, styrene oxide, glycidol, decylene oxide, triphenyl glycidyl silane, allyl glycidyl ether, methyl glycidyl ether, phenyl glycidyl ether, butyl glycidyl sulfide, glycidyl methyl sulfone, glycidyl methacrylate, glycidyl acrylate, glycidyl benzoate, glycidyl acetate, glycidyl octanoate, glycidyl sorbate, glycidyl allyl phthalate, phenyl-(p-octadecyloxybenzoyl) ethylene oxide,

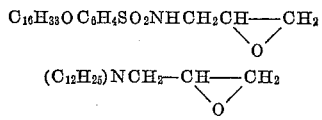

and the like. The preferred monoepoxides are the monoepoxide substituted hydrocarbons, the monoepoxy-substituted ethers, sulfides, sulfones and esters wherein the said compounds contain no more than eighteen carbon atoms.

Optionally, a low molecular weight polyhydric alcohol may be incorporated into the hydroxyl containing material in order to obtain better mechanical properties in the resultant foam. The preferred alcohols for this purpose are trimethylol propane, glycerol, ethylene glycol and diethylene glycol. Generally speaking, however, any aliphatic alcohol containing at least two hydroxyl groups may be employed.

It has been found that in some cases more desirable physical properties are obtained if a monomeric 1,2-epoxide is added to the isocyanate prior to reaction with the hexahalocyclopentadiene adduct. Any of the aforementioned 1,2-epoxides may be employed.

Various additives can be incorporated which may serve to provide different properties. For instance, antimony oxide can be used to improve fire-resistance, fillers, such as clay, calcium sulfate or ammonium phosphate may be added to lower cost, and improve density and fire-resistance; ingredients such as dyes may be added for color, and fibrous glass, asbestos, or synthetic fibers may be added for strength.

The following examples are found.

EXAMPLE 1

Chlorine Containing Resinous Material

Five hundred and ninety-three grams of powdered 1,4,5,6,7,7-hexachlorobicyclo - (2.2.1)-5 - heptene - 2,3-dicarboxylic acid (having a particle size of ten mesh) was added slowly to thirteen hundred and eighty grams of a mixture of eighty percent 2,4-tolylene diisocyanate and twenty percent 2,6-tolylene diisocyanate at a temperature of eighty degrees centigrade. There was a brisk evolution of gas throughout the addition of the acid. After this final addition of the acid, the temperature was raised to one hundred and ten degrees centigrade for one-half an hour. The product was cooled and discharged to yield a liquid resinous product of the following characteristics:

NCO content_____percent__ 29.7
Cl content_____do____ 17.5
Gardner viscosity at 25° C_____seconds__ 8.0

EXAMPLE 2

Prepartion of a Rigid Polyurethane Foam

To one hundred grams of the resinous reaction product obtained in Example 1, was added twenty-five grams of trichlorofluoromethane foaming agent. The two materials were mixed together at room temperature. To this solution was added one hundred grams of a commercial resin prepared from thirty-five parts by weight of a polyether which is the reaction product of trimethylol propane and propylene oxide having a hydroxyl number of three hundred and ninety-two, and sixty-five parts by weight of a polyester prepared from twelve moles of trimethylol propane, six moles of 1,4,5,6,7,7-hexachlorobicyclo-(2.2.1) - 5-heptene - 2,3-carboxylic acid reacted to an acid number of less than ten and having a hydroxyl number of three hundred and sixty-five. The combined hydroxyl number of the polyether-polyester mix was three hundred and seventy-five. One-half gram of dibutyltin dilaurate was added as a catalyst and the mixture rapidly stirred for fifteen seconds. The reaction begins immediately and yields a rigid, flame retardant foam having a density of 2.3 pounds per cubic foot and a chlorine content of about twenty percent by weight.

EXAMPLE 3

Preparation of a Flexible Polyurethane Foam

To seventy-one grams of the reaction product of Example 1 was added a solution of the following ingredients: one hundred grams of polypropylene glycol having a molecular weight of about two thousand and a hydroxyl number of fifty-six; three grams of concentrated aqueous ammonium hydroxide, twenty-eight percent solution; 0.7 gram of dimethyl silicone (Dow-Corning 200); and 0.5 gram of dibutyltin dilaurate. The mixture was stirred for fifteen seconds and poured into a mold. It was cured for fifteen minutes at one hundred and twenty degrees centigrade after which time it was compressed and cured for fifteen additional minutes at one hundred and twenty degrees centigrade. The resultant flexible foam had a density of 2.6 pounds per cubic foot, a chlorine content of about seven percent, and was self extinguishing upon ignition and the molten material was also self extinguishing.

The following chart shows the preparation of various chlorine containing resinous materials of the present invention. In every case the resins were prepared in a manner after Example 1. The resins are designated resins I, II, III and IV for convenient reference.

CHART I.—CHLORINE CONTAINING RESINOUS MATERIAL

| Ex. | Resin No. | Amount of adduct | Amount of tolylene diisocyanate, 80-20 isomeric mixture |
|---|---|---|---|
| 4 | I | 542 grams of 1,4,5,6-tetrachloro-7,7-difluorobicyclo - (2.2.1) - 5 - heptene - 2,3-dicarboxylic acid. | 1,380 grams. |
| 5 | II | 614 grams of 1,4,5,6,7,7-hexachloro-2-methylbicyclo - (2.2.1) - 5 - heptene - 2,3-dicarboxylic acid. | Do. |
| 6 | III | 614 grams of 1,4,5,6,7,7-hexachlorobicyclo-(2.2.1) - 5 - heptene - 2 - acetic - 2 - carboxylic acid. | Do. |
| 7 | IV | Resin of Example 1. | |

The following chart shows the preparation of various hydroxyl containing materials of the present invention and the hydroxyl numbers thereof. The hydroxyl containing materials are designated hydroxyl A, B, C, D and E for convenient reference.

CHART II.—HYDROXYL CONTAINING MATERIAL

| Ex. | Hydroxyl material | Preparation | OH number |
|---|---|---|---|
| 8 | A | Hydroxyl containing material of Example 2. | |
| 9 | B | Hydroxyl material A modified with 20 parts of trimethylol propane. | 555 |
| 10 | C | 50 parts polyether which is a reaction product of trimethylolpropane and propylene oxide having a hydroxyl number of 392 plus 50 parts reaction product of 7.6 moles glycerol, 4 moles 1,4,5,6,7,7-hexachlorobicyclo-(2.2.1)-5-heptene-2,3-dicarboxylic acid, and two moles of adipic acid. | 328 |
| 11 | D | Hydroxyl containing material of Example 3. | |
| 12 | E | 50 parts hydroxyl material D plus 50 parts adduct of 4 moles propylene oxide and 1 mole 1,4,5,6,7,7-hexachlorobicyclo-(2.2.1)-5-heptene-2,3-dicarboxylic acid. | 108 |

The following chart shows the preparation of various polyurethane foams utilizing the procedure employed in Example 2 for the rigid foams, and Example 3 for the flexible and semi-rigid foams.

CHART III

| Example | Amount chlorine containing resinous material | Amount hydroxyl containing material | Type | Density in pounds per cubic foot | Percent chlorine content | Self-extinguishing | Molten material self-extinguishing |
|---------|---------------------------------------------|-------------------------------------|------|----------------------------------|--------------------------|--------------------|------------------------------------|
| 13 | 97.5 grams resin I | 100 grams hydroxyl material A | Rigid | 2.4 | 17 | Yes | |
| 14 | 100 grams resin II | do | do | 2.5 | 20 | Yes | |
| 15 | 100 grams resin III | do | do | 2.5 | 20 | Yes | |
| 16 | 100 grams resin IV | 100 grams hydroxyl material B | do | 2.3 | 18 | Yes | |
| 17 | do | 100 grams hydroxyl material C | do | 2.6 | 19 | Yes | |
| 18 | 69.2 grams resin I | 100 grams hydroxyl material D | Flexible | 2.4 | 6 | Yes | Yes. |
| 19 | 73 grams resin I | do | do | 2.3 | 7 | Yes | Yes. |
| 20 | 73 grams resin III | do | do | 2.5 | 7 | Yes | Yes. |
| 21 | 56 grams resin IV | 100 grams hydroxyl material E | Semi-rigid | 3.2 | 17 | Yes | Yes. |

This application is a continuation-in-part of S.N. 821,722, filed June 22, 1959, entitled "Resinous Compositions and Method of Preparation." The resinous reaction products of the present invention may also be used to prepare fire-resistant surface coatings, fire-resistant elastomers or rubbers, and fire-resistant adhesives, see S.N. 821,722, which discloses the method of preparing these materials.

This invention may be embodied in other forms or carried out in other ways without departing from the spirit or essential characteristics thereof. The present embodiment is therefore to be considered as in all respects, illustrative, and not restrictive, the scope of the invention being indicated by the appended claims, and all changes which come within the meaning and range of equivalency of the claims are intended to be embraced therein.

We claim:

1. A fire resistant cellular reaction product comprising: (I) the liquid resinous reaction product of (A) the dicarboxylic acid adduct of hexahalocyclopentadiene and a dicarboxylic compound containing aliphatic carbon to carbon unsaturation wherein the halogen is selected from the group consisting of chlorine, bromine, fluorine, and mixtures thereof, and (B) an organic polyisocyanate; and (II) a hydroxyl containing polymeric material having a hydroxyl number of between thirty and six hundred and fifty selected from the group consisting of (A) a polyester comprising the reaction product of a polyhydric alcohol and a polycarboxylic compound, (B) a polyether comprising the reaction product of a monomeric 1,2-monoepoxide, and a compound selected from the group consisting of a polyhydric alcohol and a polycarboxylic acid, and (C) mixtures thereof; and (III) a foaming agent; said liquid reaction product being present in an amount sufficient to provide ninety to one hundred and ten percent of isocyanato groups with respect to the total number of hydroxyl and carboxyl groups present in the hydroxyl-containing polymeric material and the foaming agent.

2. The fire resistant cellular reaction product of claim 1 wherein said adduct of hexahalocyclopentadiene is 1,4,5,6,7,7-hexachlorobicyclo - (2.2.1)-5 - heptene-2,3-dicarboxylic acid.

3. The fire resistant cellular reaction product of claim 2 wherein said hydroxyl containing polymeric material has a hydroxyl number of between two hundred and six hundred and fifty.

4. The fire resistant cellular reaction product of claim 3 wherein the polyester portion of said hydroxyl containing polymeric material comprises the reaction product of (I) a polyhydric alcohol and (II) an adduct of hexahalocyclopentadiene and a polycarboxylic compound, wherein the halogen is selected from the group consisting of chlorine, bromine, fluorine and mixtures thereof.

5. The fire resistant cellular reaction product of claim 4 wherein said adduct of hexahalocyclopentadiene and a polycarboxylic compound is 1,4,5,6,7,7-hexachlorobicyclo-(2.2.1)-5-heptene-2,3-dicarboxylic acid.

6. The fire resistant cellular reaction product of claim 2 wherein said organic polyisocyanate is tolylene diisocyanate.

7. The fire resistant cellular reaction product of claim 2 wherein said organic polyisocyanate is a mixture of 2,4-tolylene diisocyanate and 2,6-tolylene diisocyanate.

8. The process for preparing a fire resistant cellular reaction product which comprises adding the dicarboxylic acid adduct of hexahalocyclopentadiene and a dicarboxylic compound containing aliphatic carbon-to-carbon unsaturation wherein the halogen is selected from the group consisting of chlorine, bromine, fluorine and mixtures thereof to an organic polyisocyanate in the ratio of one carboxyl group to at least four isocyanato groups to form a liquid resinous reaction product; and thereafter mixing said liquid product with a hydroxyl-containing polymeric material having a hydroxyl number of between thirty and six hundred and fifty selected from the group consisting of (A) a polyester comprising the reaction product of a polyhydric alcohol and a polycarboxylic compound, (B) a polyether comprising a reaction product of a monomeric 1,2-monoepoxide and a compound selected from the group consisting of a polyhydric alcohol and a polycarboxylic acid, and (C) mixtures thereof, in the presence of a foaming agent; said liquid product being used in an amount sufficient to provide ninety to one hundred and ten percent of isocyanato groups with respect to the total number of hydroxyl and carboxyl groups present in the hydroxyl-containing polymeric material and the foaming agent.

9. The process according to claim 8 wherein the adduct of hexahalocyclopentadiene is 1,4,5,6,7,7-hexachlorobicyclo-(2.2.1)-5-heptene-2,3-dicarboxylic acid.

10. The process according to claim 8 wherein the polyester portion of said hydroxyl-containing polymeric material comprises the reaction product of a polyhydric alcohol, and an adduct of hexahalocyclopentadiene and a polycarboxylic compound, wherein the halogen is selected from the group consisting of chlorine, bromine, fluorine and mixtures thereof.

11. The process according to claim 10 wherein said adduct of hexahalocyclopentadiene is 1,4,5,6,7,7-hexachlorobicyclo-(2.2.1)-5-heptene-2,3-dicarboxylic acid.

References Cited in the file of this patent

FOREIGN PATENTS

| 779,077 | Great Britain | July 17, 1957 |
| 1,165,410 | France | June 2, 1958 |